March 21, 1967 J. C. KAPPEL 3,309,941
SECTIONAL CRANKSHAFT
Filed July 15, 1965 4 Sheets-Sheet 1

Inventor:
James C. Kappel,
by Hood, Gust & Diehl
Attorneys.

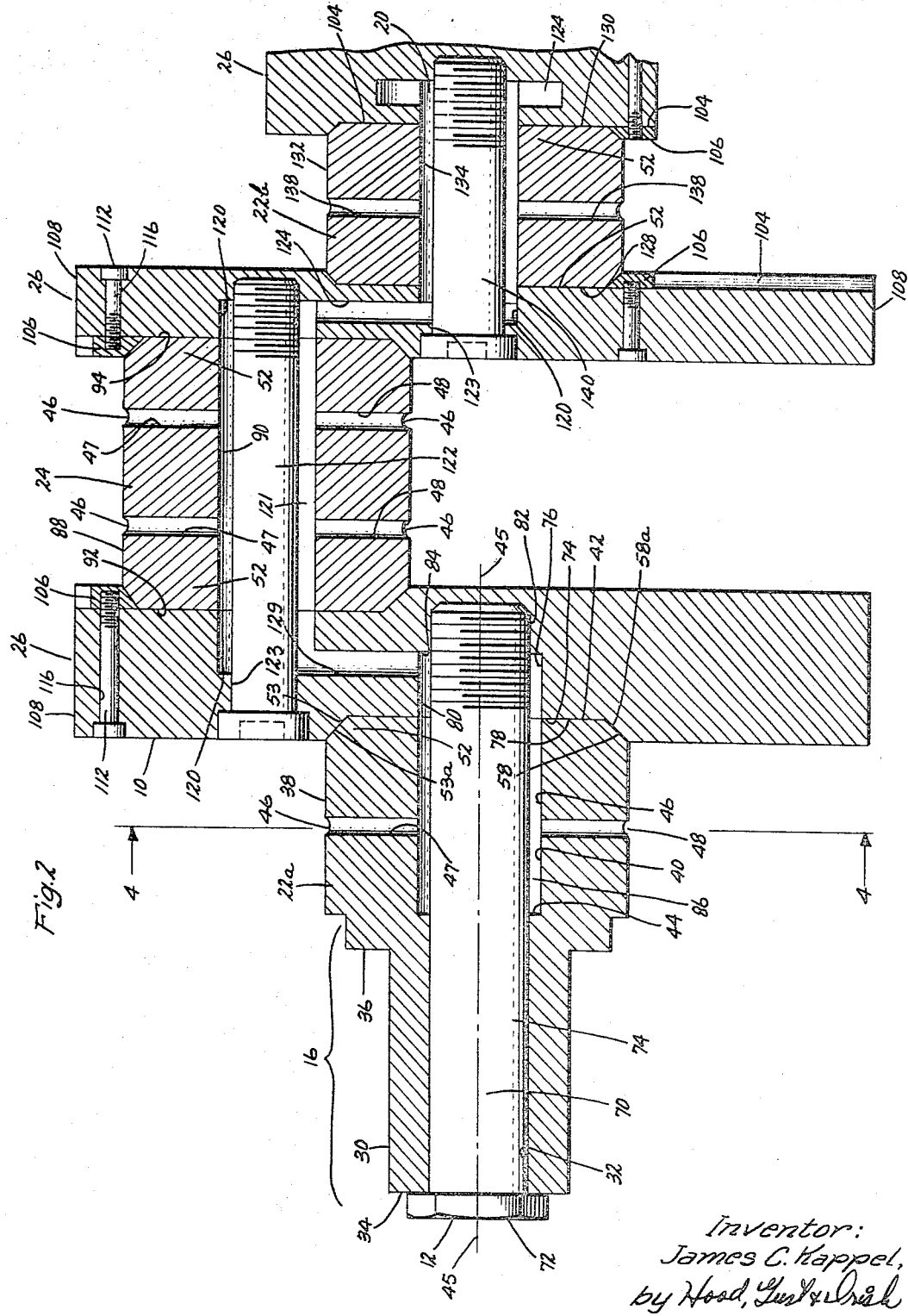

March 21, 1967 J. C. KAPPEL 3,309,941
SECTIONAL CRANKSHAFT
Filed July 15, 1965 4 Sheets-Sheet 3
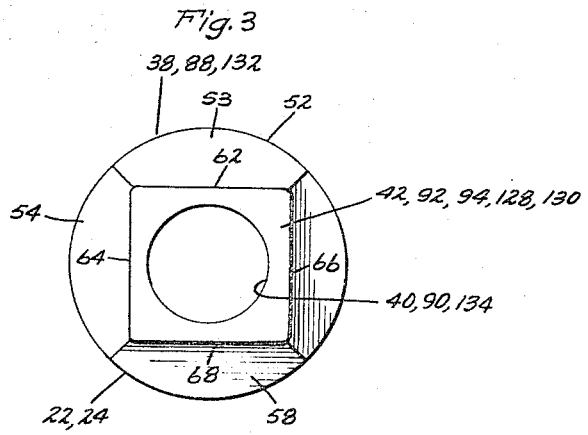
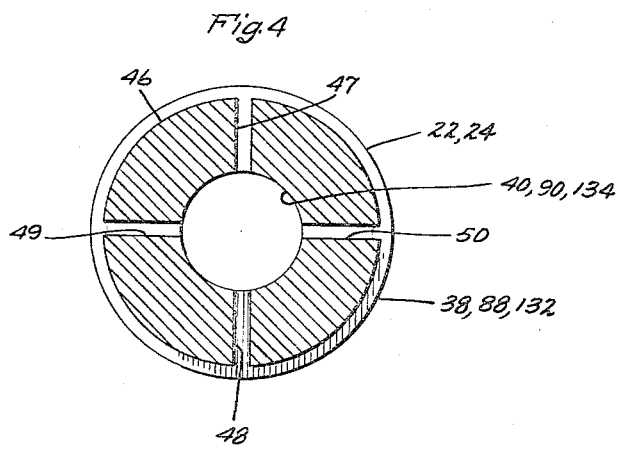
Inventor:
James C. Kappel
by Hood, Gust & Oris
Attorneys March 21, 1967 J. C. KAPPEL 3,309,941
SECTIONAL CRANKSHAFT
Filed July 15, 1965 4 Sheets-Sheet 4

Inventor:
James C. Kappel,
by Hood Gust Irish
Attorneys.

United States Patent Office 3,309,941
Patented Mar. 21, 1967

3,309,941
SECTIONAL CRANKSHAFT
James C. Kappel, 1505 Archer Ave.,
Fort Wayne, Ind. 47708
Filed July 15, 1965, Ser. No. 472,192
4 Claims. (Cl. 74—597)

This invention relates to crankshafts, such as those used in internal combustion engines, and more particularly, to a crankshaft having crank cheeks and bearing pins as separable parts, any one of which can be disassembled from the remaining portion of the crankshaft and replaced when worn without replacing any of the unworn parts or the whole crankshaft as heretofore has been the custom.

It is the primary object of this invention to provide an improved engine crankshaft having a plurality of main bearing pins, a plurality of crank bearing pins, and a plurality of crank cheeks which are separate elements or parts detachably connected together.

It is also an object of this invention to provide an improved crankshaft having removable bearing pins which can be replaced when worn without removing the crankshaft from the associated engine or disturbing the other bearing pins.

It is still another object of this invention to provide an improved engine crankshaft having main bearing pins, crank bearing pins and crank cheeks as separate elements or parts which are removably secured together to provide a substantially rigid crankshaft with the bearing pins positively held against rotation relative to each other and the crank cheeks.

A further object of this invention is to provide an improved engine crankshaft in which a plurality of bearing pins are detachably connected to the crank cheeks by means of a boss integrally formed on the end of each bearing pin which fits into a recess complementary of the boss formed in the crank cheek and is held therein by a bolt secured to the crank cheek and positioned coaxially of the bearing pin in an aperture which is larger than the bolt.

Still further an object of this invention is to provide an improved engine crankshaft having a plurality of main bearing pins, a plurality of crank bearing pins, and a plurality of crank cheeks provided as separate elements and detachably connected together, each of said elements having interconnecting oil passages therein through which lubricant can pass lengthwise of the crankshaft and onto each of the bearing surfaces of the crankshaft.

The above-mentioned and other features and objects of this invention and the manner of attaining them will be best understood by reference to the following description of an embodiment of the invention taken in conjunction with the accompanying drawings, wherein:

FIG. 2 is a fragmentary, longitudinal, and cross-sectional view of the front portion of the crankshaft illustrated in FIG. 1 showing the front two main bearing pins with the two crank cheeks and the crank bearing pin located therebetween;

FIG. 3 is an end view of one of the main or crank bearing pins illustrating the boss integrally formed thereon;

FIG. 4 is a cross-sectional view taken substantially along section line 4—4 of FIG. 2.

Figure 1:
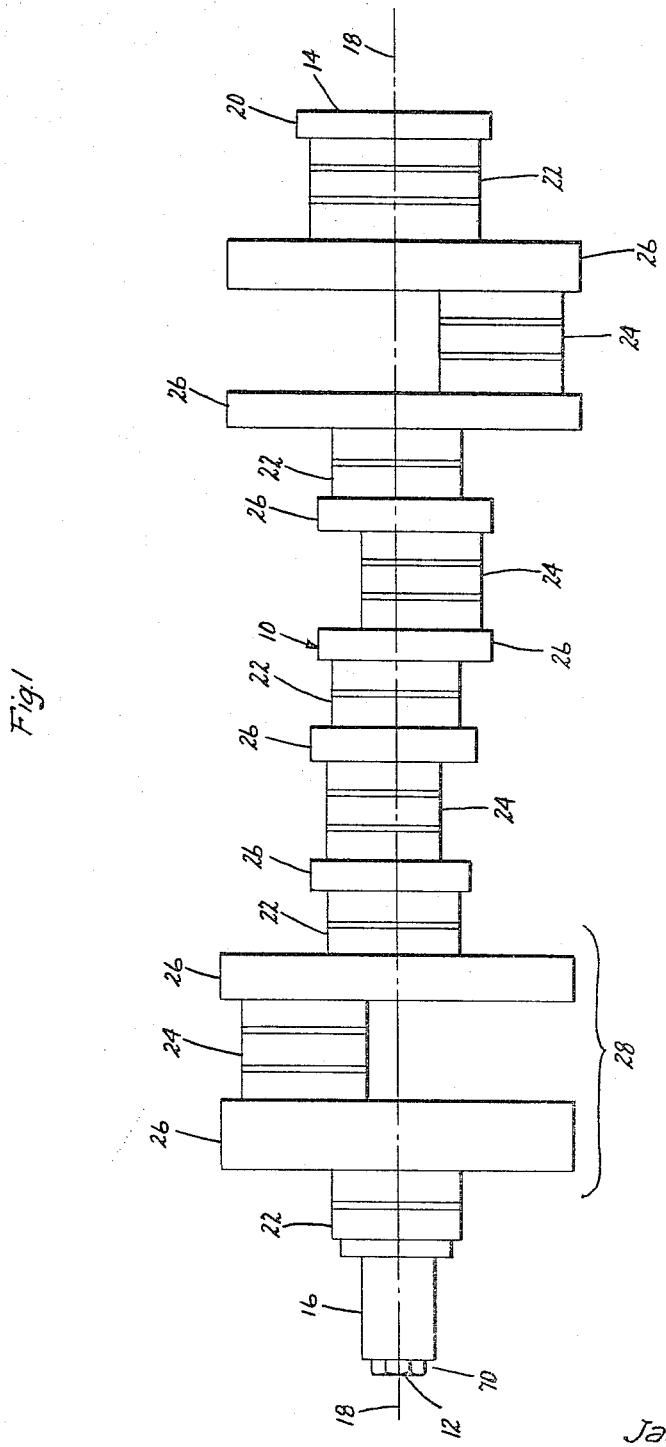
FIG. 1 is a side view of a 1958 Buick, 8-cylinder, engine crankshaft constructed in accordance with this invention and having elemental bearing pins and crank cheeks which are detachably connected together.

In the broader aspects of this invention there is provided a combination of a crank cheek and a bearing pin detachably secured together for use in a crankshaft. The bearing pin has a boss integrally formed at the ends thereof; the crank cheek has a recess in the side thereof into which the boss is fitted. The recess and the boss are complements of each other such that when means is provided to hold the boss in the recess, the bearing pin and the crank cheek are secured together.

Referring to the drawings, there is shown a crankshaft 10 having a front end 12 and a rear end 14. Adjacent the front end 12, crankshaft 10 has a pulley journal 16 to which is conventionally secured a pulley (not shown) for receiving a belt to drive the generator and water pump of the conventional internal combustion engine. Adjacent the rear end 14 of the crankshaft 10 is secured a disc-shaped flange member 20 which is conventionally provided for securing the crankshaft 10 to an engine driven component, such as the driving portion of a friction clutch. Intermediate the journal 16 and the flange portion 20 are located a plurality of main bearing pins 22 and a plurality of crank bearing pins 24. Each of the axes of the journal 16, the flange member 20 and the main bearing pins 22 are superimposed on the axis of rotation 18 of the crankshaft 10; the axes of the crank bearing pins 24 are spaced from axis 18, as will be mentioned hereinafter.

In the specific embodiment illustrated, which is a 1958 Buick, 8-cylinder, engine crankshaft, the main bearing pins 22 and crank bearing pins 24 are alternately positioned in crankshaft 10 between ends 12 and 14. Intermediate each main bearing pin 22 and crank bearing pin 24 is disposed a crank cheek 26 which serves to interconnect the bearing pins 22 and 24 and to space the axes of the crank bearing pins 24 apart from the axis 18 as hereinbefore mentioned. Thus, between journal 16 and flange 20, the bearing pins 22 and 24 and the crank cheeks 26 are provided in units comprising a main bearing pin 22, a crank cheek 26, a crank bearing pin 24 and a crank cheek 26, with the exception of an additional main bearing pin 22 being provided adjacent flange 20.

Other embodiments will vary depending upon the specific engine which each embodiment is designed for. Such other embodiments will always have crank bearing pins 24 in a number corresponding to the number of cylinders of the engine for which it is designed and three main bearing pins 22 positioned adjacent the center of the crankshaft 10, adjacent the journal 16, and adjacent the flange member 20. The number of main bearing pins 22 will vary between the aforementioned three in number and the number corresponding to main bearing pins 22 being positioned alternately of the crank bearing pins 24 as illustrated in FIG. 1.

Conventionally, adjacent crank bearings pins 24 are angularly spaced apart approximately 180° from each other. Specifically, referring to the embodiment illustrated in FIG. 1, the crank bearing pins 24 most adjacent journal 16 and flange 20, respectively, have axes (not shown) lying in the plane of the figure, and the crank bearing pins 24 most adjacent the center of the crankshaft illustrated in FIG. 1 extend generally perpendicularly away from the plane of the figure on opposite sides thereof, respectively.

Referring specifically to FIGS. 2, 3 and 4, the specific construction of a crankshaft illustrative of this invention will now be described. Since the construction of one of aforementioned units of the crankshaft 10 is illustrative of the construction of the remainder of the crankshaft 10 and the construction of that portion of the crankshaft 10 adjacent end 12 is similar to the portion adjacent end 14, only the unit adjacent end 12 of the crankshaft 10 and referred to by the reference numeral 28 will be described hereinafter with the understanding that the remaining portion of crankshaft 10 will be constructed similarly.

Describing the structure of unit 28 of the crankshaft 10, the journal 16 and the main bearing pin 22 most adjacent end 12 are integrally formed as a single piece. This bearing pin 22 will be referred to hereinafter by the reference numeral 22a. Journal 16 has a tubular shape with an exterior cylindrical surface 30 and an interior cylindrical bore 32. Surface 30 extends coaxially of the bore 32 from end 34 to a position adjacent to the step 36 which separates the journal 16 and the bearing pin 22a, and intermediate the step 36 and the opposite end 42 of the bearing pin 22a. Main bearing pin 22a extends between step 36 and end 42 and is generally cylindrical in shape. Bearing pin 22a has a cylindrical bearing surface 38 and an interior cylindrical passageway 40 which extends coaxially of the surface 38 between the position above-mentioned at which bore 32 terminates and end 42 and connects with bore 32 at step 44. Passageway 40 has a diametral dimension larger than bore 32; thus step 44 faces end 42. Passageway 40 and bore 32 are positioned in end to end relationship along a common axis 45 thus also positioning surfaces 30 and 38 on the common axis. Also coaxial with passageway 40 and surface 38 is the annular groove 46 in surface 38 which is formed therein intermediate step 36 and end 42. Extending radially of the passageway 40 at 90° intervals and extending between the groove 46 and the passageway 40 are four cylindrical passageways 47, 48, 49 and 50. Passageways 47, 48, 49 and 50 are located at a position approximately equally spaced between end surfaces 42 and step 36 and are generally parallel to end surface 42. Partially defined by end surface 42 and integrally formed onto the main bearing pin 22a is a boss 52. Boss 52 is defined by the end surface 42 which is generally square in shape and four flat engagement surfaces 53, 54, 56 and 58 exending outwardly respectively from the four boundaries 62, 64, 66 and 68 of the surface 42 and angularly of the axis of rotation 45 of the unit 28 between the last-mentioned boundaries and the peripheral bearing surface 38 of the bearing pin 22a. Each of the engagement surfaces 53 through 58 join with the two adjacent engagement surfaces at boss edges which extend from the corners of end surface 42 to bearing surface 38 thereby giving boss 52 a frusto-pyramidal shape. While end surface 42 is shown in the figures and above-described to be square, end surface 42 could be triangular, hexagonal, etc., and boss 52 could take on any of the respective frusto-pyramidal shapes.

As illustrated in FIG. 2 and aforementioned, journal 16 and bearing pin 22a are integrally formed as a single part with the bore 32 and the passageway 40 in end to end relationship and on the same axis 45. Thus formed, journal 16 and bearing pin 22a can be secured to the crank cheek 26 by means of bolt 70 having a shank portion 74 substantially of the same diameter as bore 32 such that when the bolt 70 is positioned in the bore 32 with the bolt head 72 abutted against end surface 44 of journal 16 and the threaded portion of the bolt 70 which extends from the end surface 42 of the main bearing pin 22a is threadedly secured to the crank cheek 26, no movement between the two parts about an axis transverse to axis 45 is possible. To prevent any rotation of journal 16 and main bearing pin 22a with respect to the crank cheek 26 about axis 45, the crank cheek 26 is provided with a recess 74. Recess 74 has a bottom 78 which is flat and generally square in shape and has upstanding flat sides 53a through 58a, angularly disposed to the bottom 78 extending from the four boundaries of the bottom 78 to the exterior surface of the crank cheek 26. Thus defined by the bottom 78 and the sides 53a through 58a, recess 74 has a shape which is a complement of the boss 52. As the word complement is used herein, it is meant that whenever the boss 52 is positioned within the recess 74, the boss 52 intimately fits the recess 74 with each of the surfaces 53 through 58 of the boss contiguous to surfaces 53a through 58a of the recess 74 thereby to form a unitary structure of the journal 16, bearing pin 22a and the crank cheek 26 without voids therebetween such as if they were integrally formed together. Thus shaped, the boss 52 of the main bearing pin 22a can be positioned in the recess 74 and held therein by the bolt 70 threadedly secured to the crank cheek 26 and the main bearing pin 22a and the pulley journal 16 are prevented from rotary movement in relation with the crank cheek 26 by means of the intimate fit of the boss 52 and the recess 74.

To provide lubrication for the bearing pin 22a, crank cheek 26 is provided with a pasageway 76. Passageway 76 specifically has a larger diametered portion 80 adjacent to the recess 74 which opens onto the bottom 78 of the recess 74 and a smaller diametered portion 82 separated from the portion 80 by a step 84 which faces the recess 74. Portion 80 has a diameter substantially identical with the passageway 40, and thus, forms a continuation thereof when the main bearing pin 22a is positioned in the recess 74. Smaller diametered portion 82 is threaded to receive the threaded portion of the stud portion 74 of the bolt 70 thereby to secure the journal 16 and the bearing pin 22a to the crank cheek 26 as hereinbefore mentioned. Between the step 84 separating the portions 80 and 82 and the step 44 separating the bore 32 and the passageway 40, an annular oil passage 86 is defined between the stud portion 74 of the bolt 70 and the passageway 40 and the portion 80.

As aforementioned, the main bearing pin 22 most adjacent end 14 and the flange member 20 are integrally formed together in a manner similar to that of the above-described journal 16 and bearing pin 22a. Further, the flange member 20 and main bearing pin 22 are secured to the next adjacent crank cheek 26 in a manner identical to that above-described with relation to journal 16 and main bearing pin 22a. More specifically, the main bearing pin 22 has a boss 52 formed thereon, the crank cheek has a recess 74 formed therein, and a bolt 70 extends through a passageway in the flange member 20 and the main bearing pin 22 to hold boss 52 of the main bearing pin 22 into the recess 74 of the crank cheek 26 thereby securing the member 20 and the main bearing pin 22 to the crank cheek 26.

While in the specific embodiment shown in the figures above described, the journal 16 and flange member 20 are integrally formed onto the next adjacent main bearing pin 22, in a different embodiment the journal 16 and flange member 20 may be formed as a separate piece from the main bearing pin 22 if desired. In this last-mentioned embodiment, both the journal 16 and the flange member 20 would have integrally formed thereon a boss 52 and the main bearing pin 22 would have a recess 74 formed therein similar to the boss 52 and the recess 74 above-described. Thus formed and assembled together, the bolt 70 would hold the journal 16 and the flange member in securance with the respective main bearing pins 22 as well as holding the main bearing pins 22 in securance with the respective crank cheeks 26 in the same manner as the integrally formed pieces above-described are held in securance with the respective crank cheeks 26.

Referring now to FIG. 4 in which the main bearing pin 22a is shown in cross-section, passageways 47 through 50 are shown to extend between and connect with the passageway 40 and an annular groove 46 which connects with and lies between both the exterior bearing surface 38 and passageways 47 through 50. Each of the bearing pins 22 and 24 have passageways 47 through 50 therein which are substantially identical with that shown in FIG. 4 and above-described. Each of the bearing pins 22 and 24 also have a groove 46 which connects each of the passageways 47 through 50. In the specific embodiment illustrated, each of the main bearing pins 22 has one such groove 46 and associated passageways 47 through 50 and each of the crank bearing pins 24 has two such grooves 46 and associated passageways 47 through 50. The number of such grooves and passageways in each of the bearing pins 22 and 24 in each specific crankshaft constructed in accordance with this invention will vary according to the lubricant requirements of each bearing ring 22 and 24.

Figure 5:
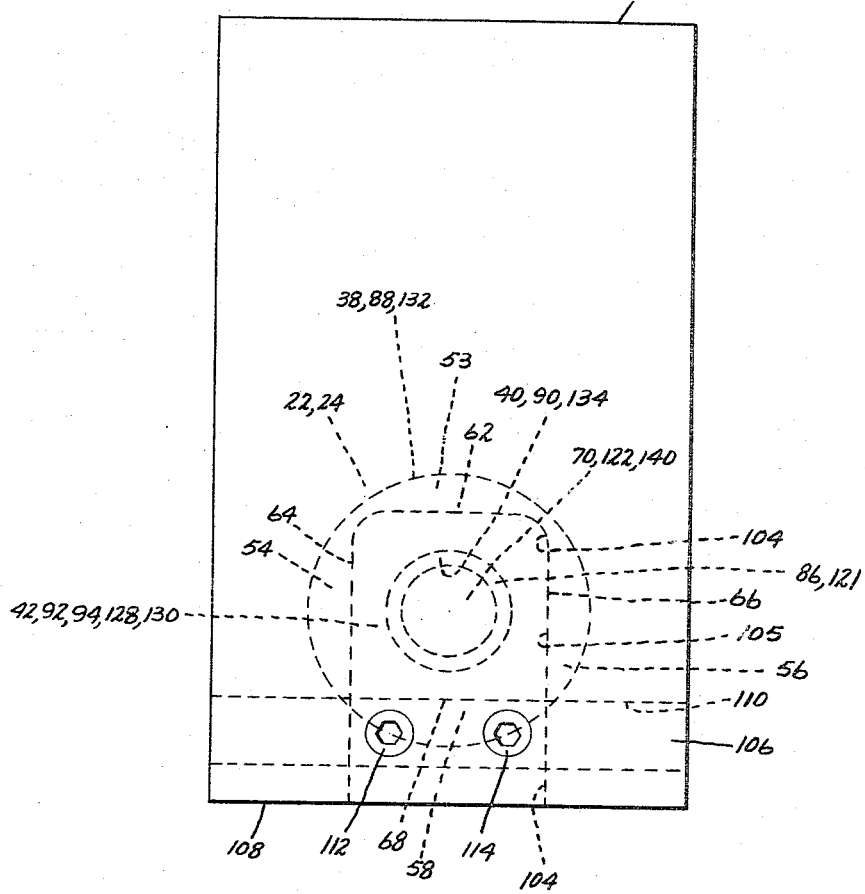
FIG. 5 is a plan view of one of the crank cheeks showing the end of one of the bearing pins, the recess into which a boss of the bearing pin fits and the key holding the boss of the bearing pin in the recess, all in dotted lines.

Now referring again to FIG. 2 and referring to FIG. 5, the crank bearing pins 24 and the securance thereof between the respective pairs of crank cheeks 26 will now be described. Each of the crank bearing pins 24 are generally cylindrical in shape and have an exterior cylindrical bearing surface 88 and an interior bore 90 extending between opposite and surfaces 92 and 94 and coaxially of the surface 88. Spaced apart and being generally parallel with the end surfaces 92 and 94 are two grooves 46 and the respective passageways 47 through 50 communicating therewith and extending between the passageway 90 and the surface 88 of the bearing pin 24. Integrally formed adjacent each end and defined partially by the end surfaces 92 and 94, respectively, are two bosses 52 therein which are identically shaped as the bosses having the same reference numerals and formed adjacent the surface 42 of the bearing pin 22a aforementioned. Formed in the crank cheeks 26 are recesses 104 which are identically shaped as the recesses 74 but which are defined on three boundaries by a slot 105 and on the one boundary most adjacent the distal and of crank cheeks 26 by a key 106 (see FIG. 5). Further, each slot 105 extends from the end 103 of the crank cheeks 26 such that the boss 52 of each crank bearing pin 24 can be slid into its securing position from end 103. Extending transversely of the slot 105 is provided a keyway 110 into which the key 106 fits and is secured by bolts 112 and 114 which are inserted through the openings 116 in crank cheeks 26 and are threadedly secured to keys 106. Thus positioned, keys 106 and slots 105 define a recess 104 which is identically shaped as the recess 74 and into which bosses 52 of the crank bearing pins 24 intimately fit. Communicating with each of the recesses 104 is a cyclindrical bore 120. Cylindrical bores 120 have diameters substantially identical with bores 90 of the crank bearing pins 24 and are on the same axis as the bore 90 when the crank bearing pin 24 is positioned in the recesses 104 and held therein by means of keys 106. Coaxial of the bores 90 and 120 is positioned a bolt 122 which extends through a passageway 123 in one of the crank cheeks 26 and is threadedly secured in the other of the crank cheeks 26 thereby to hold the bosses 52 in the respective recesses 104 in a manner similar to bolt 70 above-described. Bores 90 and 120, in combination with the shank portion of the bolt 122, define an annular oil passageway 121 which connects with the slots 47 through 50 and extends beyond the opposite ends 92 and 94 of the crank bearing pin 24 and between the bottoms of the respective bores 120. Connecting the passageway 76 and the bore 120 is an interconnecting passageway 124.

Similarly, between the other bore 120 and a similar bore not yet described which serves to secure the main bearing pin second from the end 12 of the crankshaft 10, hereinafter referred to by the reference numeral 22b, to the same crank cheek is a similar passageway 124.

Now referring again to FIG. 2 and main bearing pin 22b, main bearing pin 22b is similar to the crank bearing pin 24 except that its axial length is substantially shorter. Obviously, the respective dimensions of sizes of bearing pins 22 and 24 will be determined by the particular design of the engine. Thus, in the embodiment illustrated, while the main bearing pins 22b are actually shorter than crank bearing pins 24, in another embodiment not shown, the reverse may be true. However, each of the interior main bearing pins 22 are cylindrical in shape and have an exterior bearing surface 132, bosses 52 integrally formed at the opposite ends 128 and 130 thereof, respectively, and an interior bore 134 extending coaxially of the bearing surface 132 and between the opposite ends 128 and 130. Communicating with surface 132 is a groove 46. Extending between the groove 46 and the bore 134 are four passageways 47 through 50 which extend radially of bearing pin 22b and generally parallel of the end surfaces 128 and 130. Formed in the crank cheeks 26 between which the main bearing pins 22 are secured are recess-slots 105, bores 120, and interconnecting passageways 124 as afore-described. Coaxially positioned of bore 134 is a bolt 140 which extends through a passageway 123 in one of the crank cheeks 26 and is threadedly secured in the other to hold the bosses 52 in the respective recesses 104 similar to bolt 122 afore-described. Shank portion of the bolt 140 and the bores 134 and 120 form an annular oil passageway 121 which connect with the passageways 47 through 50 and extends between the bottoms of the oppositely facing bores 120 and with the interconnecting passageways 124 formed in the respective crank cheeks 26.

Each of the crank bearing pins 24 and the interior main bearing pins 22 are secured between pairs of crank cheeks 26 in an identical manner as afore-described throughout the entire length of the crankshaft 10. The interconnecting oil passageways 86, 124, and 121 provide that each of the bearing surfaces 38, 88 and 132 of each of the respective bearing pins 22 and 24 will be provided with lubricant. Further, slots 46 through 50 are all interconnected by means of the aforementioned passageways whereby lubricant can flow from one end of the crankshaft from within the bearing pin 22a adjacent journal 16 to the other end of the crankshaft within the main bearing pin 22 adjacent flange member 20. Thus secured together, each of the bearing pins 22 and 24 and the crank cheeks 26 form a substantially rigid crankshaft which has removable bearing pins 22 and 24.

In operation, each of the bearing pins 22 and 24 can be removed when worn without removing the crankshaft from the associated engine or disturbing the other bearing pins. For example, if the bearing pin 22a become worn and would be desirably replaced or, in the alternative, if the pulley journal 16 became scored such that it would be desirably replaced, the bolt 70 would be merely removed from the crank cheek 26 thereby allowing the worn part to be removed and a replacement part to be secured in its place.

Similarly, if either the crank bearing pin 24 or an interior main bearing pin 22 be desirably replaced, the bolts 112 and 114, the keys 106, and the bolt 122 or 140 holding the pin 24 and 22 desirably replaced, are first removed. Then the bolt 122 or 140 holding the adjacent bearing pin 22 or 24 between its respective pair of crank cheeks 26, one of the crank cheeks 26 being common to both bearing pins, is loosened thereby allowing the common crank cheek 26 to be tilted sufficiently to allow the bearing pin which is desirably replaced to be slid out of engagement with the recesses 104 and a new one substituted therefor. Upon tightening the respective bolts 124 and 140 and replacing the bolts 112 and keys 106, the crankshaft 10 is made whole and substantially rigid as before.

The strength and rigidity of a crankshaft constructed in accordance with this invention depends in no part on the bending or lateral strength of the bolts 70, 122 and 140 which hold the respective parts of the crankshaft together. The function of the bolts is solely to hold the bosses 52 in the respective recesses 74 and 104. As can be seen from FIG. 2, bolts 70, 122 and 140 are stressed only in an axial direction and only the tensile strength of the bolts is important to the strength and rigidity of the crankshaft 10. Each stress applied to the crankshaft laterally of the axis of rotation 45 thereof is thus borne by the respective parts of the crankshaft as if the crankshaft were conventionally made in a single piece.

By providing accurately machined replacement parts of the same material, the replacement of the bearing pins 22 and 24 or crank cheeks 26 does not alter the balance of the crankshaft. While slight imbalance can arise in the crankshaft, both as originally provided and after one or more of the bearing pins 22 and 24 have been replaced, conventional balancing methods which are well known and commercially used with crankshafts of other constructions can be used to render the crankshaft 10 of this invention usable and in a balanced condition.

Thus, the crankshaft 10 can be constructed in accordance with this invention to fit any known internal combustion engine. Such a crankshaft is provided with removable bearing pins 22 and 24, journal 16, flange member 20 and crank cheeks 26 which can be replaced when worn or broken without removing the crankshaft from its associated engine or disturbing the other bearing pins. Further, the respective bearing pins and the crank cheeks can be replaced without rendering the crankshaft out of balance since each of the replacement parts is substantially identical with the part replaced.

While there have been described above the principles of this invention in connection with specific apparatus, it is to be clearly understood that this description is made only by way of example and not as a limitation to the scope of this invention.

What is claimed is:

1. For use in a crankshaft, the combination comprising two crank cheeks and a bearing pin secured therebetween, said bearing pin having opposite ends and a cylindrical bearing surface, said crank cheeks each having slot means therein extending from a boundary of said crank cheek inwardly thereof for receiving one of said bearing pin ends, said slot means of said two crank cheeks being placed in facing relationship and in registry with each other, said bearing pin ends respectively being positioned in said slot means, pin means holding said bearing pin ends to said crank cheeks within said slot means, and stop means secured to said crank cheeks laterally of said slot means and adjacent to said bearing pin ends for holding said bearing pin ends against longitudinal movement in said slot means toward said boundary, said pin means and slot means cooperating to hold said bearing pin ends in said slot means, respectively, said cylindrical bearing surface extending between said two crank cheeks.

2. A crankshaft comprising two spaced opposite end and one intermediate main bearing pins, crank bearing pins disposed between each two adjacent bearing pins, crank cheeks secured to and interconnecting adjacent pairs of said main and crank bearing pins, said main and crank bearing pins and crankshaft each having an axis, said main bearing pins being coaxial, said axes of said crank bearing pins being radially spaced apart from the main bearing axis, said main and crank bearing pins each having an aperture coaxially extending therethrough and a peripheral bearing surface, said two end main bearing pins having a boss integrally formed at one end thereof, said other main and all of said crank bearing pins having a boss integrally formed at opposite ends thereof, said bosses each being coaxial of said bearing pins and having a flat end surface and four flat engagement surfaces, said end surfaces being generally square in shape with an aperture end opening in the center thereof, said engagement surfaces extending respectively from each of the boundaries of said end surfaces to said pin bearing surface, said end surfaces being perpendicular to the axes of said bearing pins, said engagement surfaces being angularly disposed to said end surfaces and said bearing pin axes, said engagement surfaces each joining adjacent engagement surfaces at boss edges which extend from the corners of said end surface to said pin bearing surface whereby each of said bosses has a frusto-pyramidal shape, said crank cheeks having oppositely facing recesses adjacent one end and the center thereof, respectively, and an oil passage therein with opposite ends respectively communicating with said recesses, said crank cheeks havinng a slot therein extending longitudinally thereof between each recess and said one end, said crank cheeks having a keyway extending transversely of each slot adjacent to said one end, said recesses each receiving a boss of one of said main and crank bearing pins, said recesses being complements of said bosses, and a key secured in each keyway, each key cooperating with the respective slot to define the respective recess, said crank cheek oil passages connecting said apertures of said bearing pins, rod means extending through each of said bearing pin apertures, and having opposite end portions secured in adjacent crank cheeks for holding the bosses of said bearing pins in their respective recesses and securing said bearing pins to said crank cheeks, said rod means having a diameter smaller than the corresponding dimension of said apertures whereby an oil passage is defined between said rod means and said bearing pins, said bearing pin oil passages extending longitudinally of said bearing pins and interconnecting said crank cheek oil passages, each of said main and crank bearing pins having radial passages extending between said bearing pin oil passage and bearing surface, whereby lubricant can flow longitudinally of the crankshaft and onto each of said bearing surfaces.

3. For use in a crankshaft, the combination comprising a crank cheek and a bearing pin secured together, said bearing pin having an aperture extending therethrough and a peripheral bearing surface, a boss formed on said pin at one end thereof, said crank cheek having a slot means in one side thereof extending from a boundary of said crank cheek inwardly thereof and an oil passage therein communicating with said slot means, said slot means receiving said boss, said oil passage communicating with said aperture, rod means extending through said aperture and having an end portion secured to said crank cheek for holding said boss in said slot means and securing said pin to said crank cheek, said rod means having a diameter smaller than the corresponding dimension of said aperture whereby an oil passage is defined between said rod means and said bearing pin, said bearing pin oil passage extending longitudinally of said bearing pin and being interconnected with said crank cheek oil passage, and stop means secured to said crank cheek laterally of said slot means and adjacent to said boss for holding said boss against lateral movement in said slot means toward said boundary, said rod means and slot means cooperating to hold said boss in said slot means, said bearing surface extending outwardly from said one side of said crank cheek, said bearing pin having radially extending slots extending between said bearing pin oil passage and bearing surface, whereby lubricant can flow longitudinally of the crank shaft and onto said bearing surface.

4. For use in a crankshaft, the combination comprising a crank cheek and a bearing pin secured together, said bearing pin having a bearing surface, a boss formed on said pin at one end thereof, said crank cheek having a slot means in one side thereof extending from a boundary of said crank cheek inwardly thereof, said slot means receiving said boss, rod means for holding said boss in said slot means, and stop means secured to said crang cheek laterally of said slot means and adjacent to said boss for holding said boss against lateral movement in said slot means toward said boundary, said rod means and slot means cooperating to hold said boss in said slot means, said bearing surface extending outwardly from said one side of said crank cheek.

References Cited by the Examiner

UNITED STATES PATENTS

| 2,109,526 | 3/1938 | Fell | 74—597 |
| 2,730,912 | 1/1956 | Marinelli | 74—597 |

FOREIGN PATENTS 93,365    3/1922    Switzerland.

FRED C. MATTERN, JR, *Primary Examiner.*

W. S. RATLIFF, *Assistant Examiner.*